United States Patent [19]

Brugel

[11] Patent Number: 5,017,685

[45] Date of Patent: May 21, 1991

[54] PROCESS FOR EXTRACTING METAL RESIDUE FROM POLY(ETHER KETONE KETONES)

[75] Inventor: Edward G. Brugel, Wilmington, Del.

[73] Assignee: E.I. du Pont de Nemours and Company, Wilmington, Del.

[21] Appl. No.: 315,292

[22] Filed: Feb. 24, 1989

[51] Int. Cl.$^5$ .............................................. C08G 67/00
[52] U.S. Cl. ................................... 528/480; 528/125; 528/126; 528/486; 528/492; 528/493
[58] Field of Search ............... 528/480, 125, 126, 486, 528/492, 493

[56] References Cited

U.S. PATENT DOCUMENTS 4,611,033 9/1986 Maresca ............................... 525/419

OTHER PUBLICATIONS

Instability Constants of Complex Compounds, K. B. Yatsimirski et al., 1960.

Primary Examiner—Morton Foelak
Assistant Examiner—Frederick Krass
Attorney, Agent, or Firm—Paul R. Steyermark

[57] ABSTRACT

Metal residues are extracted from poly(ether ketone ketones) with aliphatic alpha-hydroxycarboxylic acids or aromatic ortho-hydroxycarboxylic acids in a liquid phase, either neat or in an aqueous or a nonaqueous solution. Extraction of metal residues, which usually derive from the catalysts used in the preparation of poly(ether ketone ketones), improves both the color and the thermal stability of these polymers.

10 Claims, No Drawings

PROCESS FOR EXTRACTING METAL RESIDUE FROM POLY(ETHER KETONE KETONES)

BACKGROUND OF THE INVENTION

This invention relates to a process for purifying certain poly(ether ketone ketones), sometimes abbreviated herein as PEKK's.

PEKK's form a class of thermoplastic polymers especially useful in applications where their high melting temperatures and excellent mechanical properties are important, e.g., in aircraft interior panels and in electrical insulation for electrical conductors.

PEKK's are usually made, either directly or via an oligomer intermediate, from an aromatic ether, most frequently diphenyl ether, and an aromatic diacid dichloride or mixture of two or more such diacid dichlorides, most frequently a mixture of terephthalyl chloride and isophthalyl chloride, in the presence of a Friedel-Crafts catalyst, usually aluminum chloride, $AlCl_3$.

The catalyst or catalyst residue is difficult to remove from the PEKK because the metal, especially aluminum, is complexed by the polymer carbonyl and ether groups and thus held very tightly. Yet, if not removed, the catalyst residue will promote polymer degradation and discoloration, and therefore is an undesirable contaminant.

Maresca describes in U.S. Pat. No. 4,611,033 a process for stabilizing a poly(aryl ether ketone) such as PEKK, which comprises treating the polymer with a dicarbonyl chelating agent. The dicarbonyl chelating agents used in the reference process have the formula

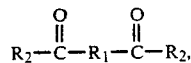

where $R_1$ is an alkylene or cycloalkylene radical, and $R_2$ is hydrogen, alkyl, cycloalkyl, or aryl. A chelating agent exemplified in the reference is 2,4-pentanedione. Even though 2,4-pentanedione (also known as acetylacetone) is commercially available, such compounds are quite expensive an economically attractive in certain applications, especially where the PEKK does not have a sufficiently high value in use. It, therefore, would be desirable to provide a less expensive but at least equally effective process for removing metal residues from PEKK's.

SUMMARY OF THE INVENTION

According to this invention, there is provided a process for extracting a metal residue from a solid, particulate poly(ether ketone ketone), wherein poly(ether ketone ketone) is contacted with good agitation at an elevated temperature for a period of at least about 20 minutes with an extracting agent which is a $C_2$-$C_{18}$ aliphatic, carboxylic, alpha-hydroxy acid, or an aromatic, carboxylic, ortho-hydroxy acid, which extracting agent is in a liquid phase, separating the hot liquid phase from the polymer otherwise than by distillation or evaporation, and recovering the purified polymer.

DETAILED DESCRIPTION OF THE INVENTION

PEKK's which thus can be purified by the process of this invention are well known and include, i.a., those described in the aforementioned U.S. patent to Maresca, as well as those described, e.g., in U.S. Pat. No. 4,361,693 (Jansons) and in the copending patent application Ser. No. 06/762,252 (Brunette et al.), now U.S. Pat. No. 4,816,556, all of which are incorporated herein by reference. Generally, all PEKK's which are made in the presence of a Friedel-Crafts catalyst can be purified by the process of the present invention.

Typical Friedel-Crafts catalysts include, in addition to aluminum chloride, antimony pentachloride, ferric chloride, aluminum bromide, boron trifluoride, zinc chloride, antimony trichloride, ferric bromide, and stannic chloride.

The hydroxy acids useful as the extracting agents according to the process of this invention include, among others, lactic acid, glycolic acid, alpha-hydroxybutyric acid, alpha-hydroxypentanoic acid, alpha-hydroxyhexanoic acid, alpha-hydroxydecanoic acid, alpha-hydroxydodecanoic acid, alpha-hydroxyhexadecanoic acid, alpha-hydroxyoctadecanoic acid, salicylic acid, 4-methyl-2-hydroxybenzoic acid, tartaric acid, and gluconic acid.

The extracting agent is in a liquid phase, which means that it itself is a liquid; or that, if it is a solid, the process is run above its melting point; or that it is in solution, which may be in water, in an organic solvent, or in any mixture thereof.

Lower molecular weight alpha-hydroxy acids as well as polyhydroxylic acids (such as, e.g., tartaric and gluconic) either are liquid or are water soluble, or both; and, when they are used, the process of the present invention usually can be carried out in an aqueous medium. The PEKK to be purified is granulated or powdered and then contacted with neat alpha-hydroxy acid or with a boiling aqueous solution of alpha-hydroxy acid. In order to improve contact between the polymer and the extracting agent, a small amount of an organic liquid such as, e.g., a lower alcohol a lower ketone, N,N-dimethylformamide, or dimethyl sulfoxide, may be added.

Higher molecular weight alpha-hydroxy acids, such as, e.g., alpha-hydroxyhexadecanoic acid and alpha-hydroxyoctadecanoic acid, are soluble in a number of organic solvents, such as, e.g., hydrocarbons, organic esters, and organic ketones. Suitable solvents will include, e.g., octane, decane, ethyl acetate, and methyl ethyl ketone. Those higher alpha-hydroxy acids also can be used neat.

In the practical operation of the process of this invention, the PEKK to be purified and the extracting agent in either aqueous or nonaqueous medium are contacted with good agitation at a temperature which will vary from about 60° C. to about 120° C., for a period of about 30 to 180 minutes. The solid polymer is then separated from the hot liquid phase. This can be done by any suitable technique not involving distillation or evaporation, such as, e,g, filtration, decantation, centrifugation, etc. The polymer then is washed with water and dried, and it is suitable for use in its intended application.

It is surprising that alpha-hydroxy acids are effective extracting agents according to the process of the present invention because they are not as strong chelating agents as are certain diketones, for example, acetylacetone. The book: *Instability Constants of Complex Compunds* by K. B. Yatsimirski and V. P. Vasil'ev (translated by D. A. Patterson), Pergamon Press, New York, 1960, defines the instability of the complexes:

$$MA_n = M + nA \text{ as } K = \frac{[M][A]n}{[MA_n]} \text{ and } pK = -\log K,$$

where M is the metal; A is the complexing agent; and n is the number of moles of the complexing agent in the complex per one gramatom of metal.

According to that definition, the larger the pK value the more stable the complex. Complexes of acetylacetone are shown in the tables in that book to be distinctly more stable than complexes of citric, glycolic, glyceric, gluconic, lactic, maleic, salicylic, and tartaric acids. Based on those tables, one skilled in the art would expect complexes of alpha-hydroxy acids with Friedel-Crafts catalyst residues to be less stable by several orders of magnitude than the corresponding complexes with acetylacetone.

Since extraction by means of these agents must be viewed as a competitive reaction in which the extracting agent forms a complex with metal residue already complexed by the carbonyl groups of PEKK, it would be a natural a priori assumption that alpha-hydroxy acids would be very inefficient and certainly much less efficient than diketones, or at least than acetylacetone. Therefore, the good efficiency of these alpha-hydroxyacids is remarkable, to say the least.

This invention is now illustrated by examples of certain preferred representative embodiments thereof, where all parts, proportions, and percentages are by weight unless otherwise indicated.

EXAMPLE 1

PREPARATION OF POLYMER

A 3-liter glass reactor was charged with 87.60 g (0.515 mole) of diphenyl ether (99.9% purity, Dow Chemical Co.), 70.70 g (0.35 mole) of terephthalyl chloride (Du Pont, Technical grade), 30.30 g (0.15 mole) of isophthalyl chloride (Du Pont Technical grade), 1.30 g of 1,3,5-benzenetricarboxylic acid chloride (trimesyl chloride) (0.005 mole), and 2200 ml of o-dichlorobenzene. The mixture was cooled to 0–5° C., and 202 g (1.51 moles) of anhydrous aluminum chloride (Witco ACL-0008) was added while the temperature was maintained at 0–5° C. Upon completion of the aluminum chloride addition, the reaction temperature was increased to 100 C at a rate of approximately 10° C./min. The reaction was held at 100° C. for 30 minutes and then was allowed to cool to room temperature. Once at room temperature, the agitation was stopped and the o-dichlorobenzene was removed by means of a vacuum filter stick. Methanol (1200 ml) was added slowly with agitation, keeping the temperature below 45° C. The mixture was stirred for 30 minutes and filtered. The polymer was washed two times with methanol. Approximately 10 ml of formic acid was added, and the polymer was dried in vacuum for 12 hours at 180° C. Analysis of the dried polymer showed 4,000–4,400 ppm of residual aluminum.

EXAMPLE 2

EXTRACTION OF DRY POLYMER WITH LACTIC ACID

Dry polymer (20 g) prepared by the procedure described in Example 1 was placed in a 500 ml 3-neck, round bottom flask, fitted with a thermowell, condenser and nitrogen purge. dl-Lactic acid, 250 ml, was added, and the mixture was heated to 100° C. for 2 hours. The mixture was cooled and filtered. The polymer was washed two times with water and dried in vacuum for 12 hours at 180° C. Analysis showed the polymer to contain 365 ppm aluminum.

EXAMPLE 3

EXTRACTION OF WET POLYMER WITH SALICYLIC ACID

Crude solid polymer, wet with methanol (100 ml of wet material, measured in a graduate cylinder) prepared by the procedure described in Example 1 was placed in a 500 ml 3-neck, round bottom flask, fitted with a thermowell, condenser and nitrogen purge. Freshly distilled, peroxide-free triisopropylbenzene, 250 ml, and 25 g of salicylic acid were added and the mixture was heated to 193° C., then held at 193-200° C. for 1 hour. The mixture was filtered hot, washed three times with acetone, and dried in vacuum for 12 hours at 180° C. Analysis showed the polymer to contain 1,100 ppm of aluminum.

Examples 2 and 3 show that from more than 90% to about 75% of aluminum was removed from the polymer with those representative alpha-hydroxylic acids.

COMPARATIVE EXAMPLES 1–6

Dry polymer (20 g) prepared by the procedure described in Example 1 was placed in a 500 ml 3-neck, round bottom flask, fitted with a thermowell, condenser and nitrogen purge. Two hundred and fifty ml of one of the compounds listed in Table I was added and the mixture was heated to 100° C. for 2 hours. In each case, the mixture was cooled and filtered. The polymer was washed two times with water and dried in vacuum for 12 hours at 180° C. The results of the analysis of the polymer for residual aluminum content are shown in Table I.

TABLE I

| COMP. EX. | EXTRACTION AGENT | ALUMINUM (ppm) |
| --- | --- | --- |
| 1 | Dist. 1,3,5-triisopropylbenzene | 4,400 |
| 2 | 3,5-Hexanedione | 4,000 |
| 3 | Ethoxyethoxyethanol | 3,800 |
| 4 | Butyrolactone | 4,600 |
| 5 | 2-Butoxy-ethanol acetate | 3,400 |
| 6 | Diethyl malonate | 2,700 |

These comparative examples show none to at most very moderate extraction of aluminum by a variety of chemical compounds (about 33% for diethyl malonate).

EXAMPLE 4

EXTRACT OF WET POLYMER WITH LACTIC ACID

Methanol-wet polymer (100 ml) prepared by the procedure described in Example 1 was placed in a 500 ml 3-neck, round bottom flask, fitted with a thermowell, condenser, Dean-Stark trap and nitrogen purge. dl-Lactic acid, 250 ml, was added, and the mixture was heated to 100° C. for 2 hours. The mixture was cooled and filtered. The polymer was washed two times with water and dried in vacuum for 12 hours at 180° C. in the presence of 10 ml of formic acid. Analysis showed the polymer to contain 320 ppm of aluminum.

EXAMPLE 5

EXTRACTION OF WET POLYMER WITH GLYCOLIC ACID

Methanol-wet polymer (100 ml) prepared by the procedure described in Example 1 was placed in a 500 ml 3-neck, round bottom flask, fitted with a thermowell, condenser, Dean-Stark trap and nitrogen purge. Glycolic acid (70% in water), 250 ml, was added and the mixture was heated to 100° C. for 2 hours. The mixture was cooled and filtered. The polymer was washed two times with water and dried in vacuum for 12 hours at 180° C. in the presence of 10 ml of formic acid. Analysis showed the polymer to contain 700 ppm of aluminum.

Examples 4 and 5 were carried out in the expectation that methanol- (plus residual o-dichlorobenzene) swollen polymer would be extracted even more efficiently. Surprisingly, a very small additional improvement was achieved. This result shows the unexpectedly high extraction efficiency even from the dry polymer.

EXAMPLE 6

EXTRACTION OF METALS OTHER THAN ALUMINUM

Dry polymer (20 g) prepared by the procedure described in Example 1, was contaminated with additional metal residue by boiling in formic acid in a 1 liter, 316 stainless steel vessel. The contaminated polymer was placed in a 500 ml 3-neck, round bottom flask, fitted with a thermowell, condenser and nitrogen purge. dl-Lactic acid of Example 6, 250 ml, was added and the mixture was heated to 100° C. for 2 hours. The polymer was washed two times with hot water and dried in vacuum for 12 hours at 180° C. Table II compares the residual metals analysis for this polymer to that of untreated polymer.

COMPARATIVE EXAMPLE 7

EXTRACTION OF METALS OTHER THAN ALUMINUM

Dry polymer (20 g), contaminated with additional metal residue as described in Example 6, was placed in a 500 ml 3-neck, round bottom flask, fitted with a thermowell, condenser and nitrogen purge. Ethoxyethoxyethanol, 250 ml, was added and the mixture was heated to 100° C. for 2 hours. The polymer was washed two times with acetone and dried in vacuum for 12 hours at 180° C. Table II also provides the residual metals analysis for this polymer.

TABLE II

| METAL | UNTREATED | EXAMPLE 6 | COMP. EX. 7 |
|---|---|---|---|
| Mg | 120 ppm | 14 ppm | 110 ppm |
| Ni | 720 ppm | 35 ppm | 610 ppm |
| Cu | 5 ppm | 1 ppm | 2 ppm |
| V | 6 ppm | 1 ppm | 6 ppm |
| Mn | 49 ppm | 6 ppm | 36 ppm |
| Fe | 4100 ppm | 530 ppm | 3800 ppm |
| Co | 14 ppm | 2 ppm | 13 ppm |
| Cr | 1800 ppm | 145 ppm | 1700 ppm |

It can be seen from Example 6 and Comparative Example 7 that dl-lactic acid is an outstanding extractant also for metals other than aluminum.

I claim:

1. A process for extracting a metal residue from a particulate, solid poly(ether ketone ketone), wherein poly(ether ketone ketone) is contacted with agitation at an elevated temperature for a period of at least about 20 minutes with a $C_2$-$C_{18}$ aliphatic, carboxylic, alpha-hydroxy acid or an aromatic, carboxylic, ortho-hydroxy acid, said extracting agent being in liquid phase, separating the hot liquid phase from the polymer otherwise than by distillation or evaporation, and recovering the purified polymer.

2. A process of claim 1 wherein the hydroxy acid is selected from the group consisting of lactic acid, alpha-hydroxybutyric acid, salicylic acid, glycolic acid, tartaric acid, alpha-hydroxypentanoic acid, alpha-hydroxyhexanoic acid, alpha-hydroxydecanoic acid, alpha-hydroxydodecanoic acid, alpha-hydroxyhexadecanoic acid, and alpha-hydroxyoctadecanoic acid.

3. The process of claim 2 wherein the hydroxy acid is selected from the group consisting of lactic acid, salicylic acid, and glycolic acid.

4. The process of claim 3 wherein the temperature is maintained at about 60–120° C.

5. The process of claim 4 wherein the extraction time is about 30–180 minutes.

6. The process of claim 5 which is conducted with dry polymer.

7. The process of claim 5 which is conducted with solvent-wet polymer.

8. The process of claim 3 wherein the extracting agent is glycolic acid, which is used in an aqueous solution.

9. The process of claim 1 wherein the extracting agent is employed neat in liquid state.

10. The process of claim 1 wherein the extracting agent is employed in solution in water, or in an organic solvent, or in any combination thereof.

* * * * *